Figure 1:
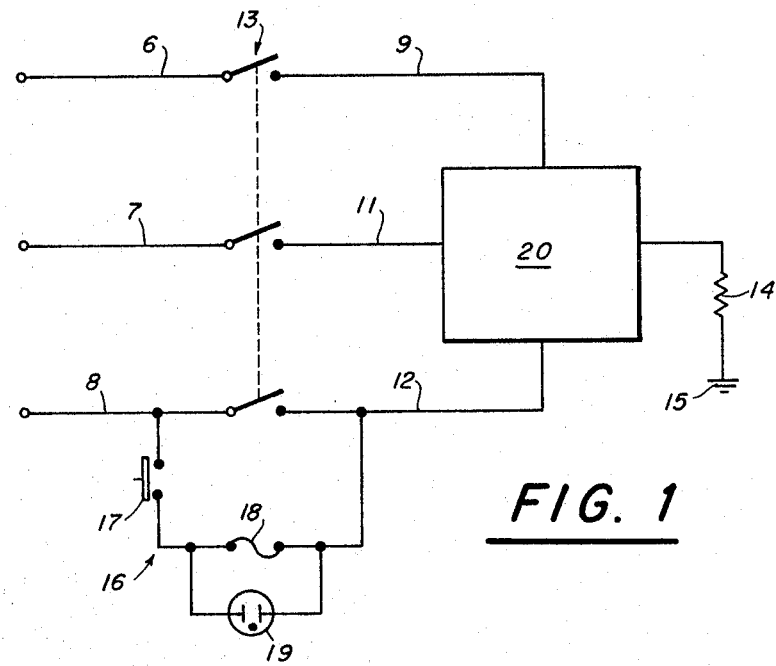

INVENTOR.
MARTIN V. JONES

United States Patent Office 3,289,075
Patented Nov. 29, 1966

3,289,075
APPARATUS INCLUDING PARALLEL CONNECTED FUSE AND LAMP MEANS FOR TESTING MOTOR INSULATION
Martin V. Jones, 4750 Malta St., Long Beach, Calif.
Filed Apr. 24, 1964, Ser. No. 362,536
2 Claims. (Cl. 324—54)

The invention described herein may be manufactured and used by or for the Government of the United States of America for governmental purposes without the payment of any royalties thereon or therefor.

The present invention relates generally to test apparatus and, in particular, to apparatus for testing the insulation resistance of motors, generators, transformers and the like.

It is a well known fact that the resistance of electrical insulation is adversely effected by dampness such as is experienced in rainy or foggy weather or when the insulated device is used aboard ship. The difficulty is most pronounced in motors and other devices which are not intended to be completely watertight, although it also is true that even water-tight motors may be affected and their insulation resistance dangerously reduced, when stored in damp areas for lengthy periods of time.

Consequently, to assure equipment safety, it has been a customary practice to test the insulation of these devices before putting them to use and, usually, such tests have required the skilled services of an electrician who utilizes certain instruments to take a so-called megger reading. If such tests are not made, the weakened resistance of the insulation may produce an expensive burn-out or, in lesser aggravated cases, the resulting short circuits and ground currents may materially shorten the insulation life.

As an example of the type of situation which the present invention contemplates, the welding equipment in the larger ship building activities may be operated by several hundred welders each using a separate machine powered by an electric motor which, of course, is a relatively expensive and valuable piece of equipment. Because of the conditions in which welding operations are performed, it is not unusual for the insulation of these motors to become so damp as to produce the burn-out or other damage if the power is applied without first having a complete check-out by an electrician. However, as will be appreciated, electrician labor represents a substantial cost as well as perhaps an even more substantial utilization of skilled labor which could be employed, more effectively, in other activities. Obviously then the situation is one in which both time and money can be saved to an appreciable degree if the insulation tests could be conducted in a simple and reliable manner by the relatively unskilled operator of the equipment.

It is therefore an object of the present invention to provide apparatus for testing motors, generators, transformers and the like, the apparatus being of a push-button-indicator type to permit its use by unskilled personnel.

A further important object is to provide apparatus of the type under consideration which is capable of being mounted on the control panel of the machine to be tested and which is unusually inexpensive both in its installation cost and its maintenance.

Another related object is to provide apparatus of the type under consideration which is capable of indicating the presence of a predetermined amount of insulation leakage current.

Yet another more detailed object is to provide apparatus for testing the insulation of a polyphase motor, generator or the like, the motor being of a type having plural induction windings each with a separate input line coupled to source by a separate power switch contact.

Other objects and features of the invention, along with their attendant advantages, will become more apparent in the ensuing detailed description.

Briefly considered, the objects of the present invention are accomplished by coupling a fused circuit across one of the contacts of the power switch used to apply line voltage to the equipment. The coupling is so made that the normal contacts of the power switch remain open permitting source power to be sent to the equipment only through the presently-provided fused circuit. The particular circuit includes a push-button switch to control its current flow, a small fuse in series with the switch, and a glow discharge device coupled in parallel with the fuse. As will become more apparent, the fuse effectively short-circuits the glow discharge device normally preventing a glow response of that device. However, when a predetermined leakage current is present, the fuse "blows" or breaks-down thereby placing the glow discharge device in series between the power supply and the grounded resistance of the insulation. Consequently, the full voltage of the power source is applied to the glow discharge device which lights to indicate faulty insulation.

Figure 2:
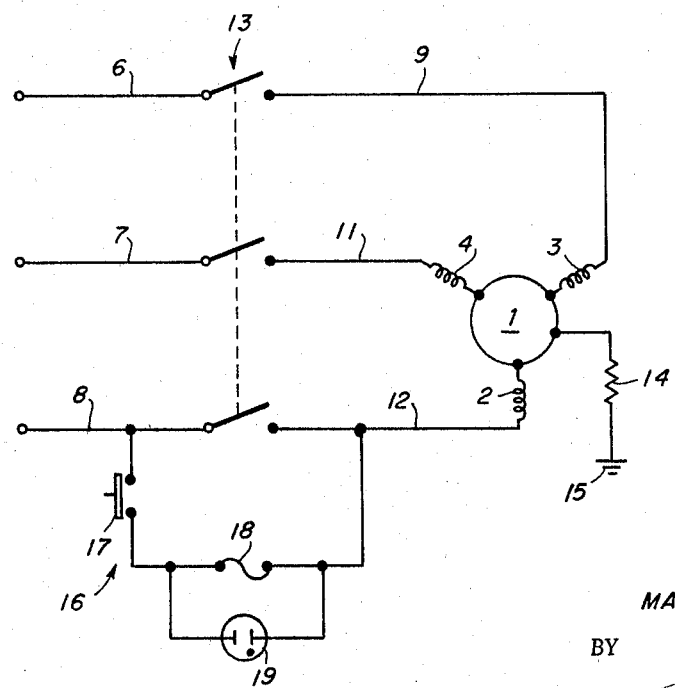

The invention is illustrated in the accompanying drawings of which:

FIG. 1 is a schematic generally illustrating the pertinent components of the equipment to be tested as well as the fused circuit of the present invention; and FIG. 2 illustrates the manner in which the present test circuit is coupled to the windings of a polyphase induction motor.

Referring to the drawings, and, in particular, to FIG. 2, the motor to be protected, generally designated by numeral 1, includes the usual windings 2, 3 and 4 which, for illustrative purposes only, are shown in a conventional Y-configuration. Power is fed to the motor through power supply lines 6, 7 and 8 and through input lines 9, 11 and 12. A power switch 13, also of a conventional variety, is disposed between the power supply lines and the input lines and, in the usual manner, the switch is shown in an open position from which it can be thrown to close its contacts and apply power to the motor.

As previously mentioned, the principal difficulty with which the present invention is concerned is that the insulation of coils 2, 3 and 4 may deteriorate due to dampness and other reasons, this fact being indicated in FIG. 2 by the showing of a resistance 14 coupled to a ground 15 which, normally, would be the grounded casing of the motor. Accordingly, a principal feature of the present invention is the use of a test circuit, generally indicated by numeral 16, which can be very simply energized to ascertain the degree to which the insulation may have been weakened. The circuit, as shown, is coupled between power supply line 8 to input line 12 so that, when energized, is capable of applying the line voltage, which may be considered as 440 volts, directly to winding 2 of the motor. If resistance 14 of the motor is faulty, the result would be the establishment of a leakage current to ground 15.

To permit this leakage current to be determined prior to the application of the 440 volts to the motor, circuit 16 includes a switch 17, coupled in series with a fuse 18. It also includes a glow discharge device 19 coupled in parallel with the fuse.

Operatively considered, when push button switch 17 is closed, the full line voltage is applied to circuit 16 and to the motor. If the resistance of the motor insulation is within a desirable limit, insufficient current flows in circuit 16 to cause fuse 18 to blow or break down. Consequently, glow discharge device 19, which may be a neon tube of the type usually employed for test lamps, pilot lights, night lights, etc., will not glow. However, when the leakage current through the insulation of the motor reaches a predetermined level, fuse 18 blows and the line voltage then is applied directly to the neon tube 19 to produce a warning light which, in the present situation, would inform the operator that the equipment is not to be started until further checked by an electrician.

FIG. 1 of the drawings is essentially the same as FIG. 2, the only significant difference being its showing of a block 20 in place of the polyphase motor of FIG. 2. Block 20 is intended to designate other types of equipments, such as various polyphase generators or transformers. As now should be apparent, the present test circuit will be found useful in any type of circuit which has plural input lines coupled to an electrical power source through plural switching contacts. In such circuits, the present test circuit can be coupled across one of these contacts leaving the others open so that the testing can be accomplished before full power is applied to all of the windings.

It is appreciated that the present test circuit can be used in different ways. However, its particular value lies in its use to ascertain the presence of a predetermined amount of insulation leakage current. Thus, it is appreciated that most equipments are incapable of maintaining absolute perfection in protective insulation. There usually will be a slight degree of leakage current which can be accepted. Indications therefore are desirable only when a certain level is exceeded and, of course, the level will vary in different machines and under varying line voltages and other conditions. In the present test circuit, the ability to cause the indicator light to glow only in response to a predetermined amount of leakage current is achieved by selecting an appropriately sized fuse 18. For example, a $\frac{1}{32}$ a. fuse may be employed on a 440 voltage motor if it is desired to determine when the insulation resistance of this motor drops below 100,000 ohms. As a general rule, the fuses should not exceed $\frac{1}{32}$ a., although smaller fuses may be substituted to ascertain lower values of leakage current. Thus, if it is desired to determine when insulation resistance to ground drops below 250,000 ohms, a $\frac{1}{100}$ a. fuse can be employed. Similarly for drops below 500,000 ohms, a $\frac{1}{200}$ a. fuse is preferred. If the line voltage is other than 440 volts A.C., other fuses of appropriate voltage and current rating can be employed although, again, it is most desirable to utilize a very small fuse.

Another factor to be considered is the glow discharge tube 19. Such tubes have a so-called "striking" voltage which must be applied before the device lights. Also, as the voltage is decreased, the glow will vanish. Various types of glow tubes or fluorescent lights may be employed in this situation providing that they fulfill the necessary limitation of producing visible indication at a voltage below that of the line voltage.

The apparatus, of course, may be incorporated in a separate test kit to be connected to the equipment as needed. However, the equipment size is so small and its cost is so minor that it presently is preferred to incorporate the circuit in the control panel of each separate equipment.

Obviously many modifications and variations of the present invention are possible in the light of the above teachings. It is therefore to be understood that within the scope of the appended claims the invention may be practiced otherwise than as specifically described.

What is claimed is:
1. A polyphase induction motor comprising:
plural induction windings,
insulation normally isolating said windings from ground potential,
a power switch having plural contacts,
a separate input line electrically connecting each of said contacts with each of said windings,
a power source, and
an electrically-conductive circuit coupling said power source to one of said windings across said power switch,
said circuit including:
a normally open manually operable test switch,
a fuse in series with the switch, and
a glow discharge indicator lamp connected in parallel with said fuse,
said circuit arrangement concurrently electrically energizing both the fuse and the indicator device when the normally-open switch is manually closed and said fuse being sized to break down when said insulation permits a leakage current of a predetermined amount, and
said glow discharge indicator lamp having a striking voltage lower than said power supply voltage whereby the lamp lights when placed in series with said power source and ground potential.

2. The apparatus of claim 1 wherein said fuse is of a size to break down when subjected to a current exceeding $\frac{1}{32}$ amperes.

References Cited by the Examiner
UNITED STATES PATENTS

| | | | |
|---|---|---|---|
| 761,417 | 5/1904 | Short | 340—255 |
| 2,518,909 | 8/1950 | Krakauer | 324—68 |
| 2,728,889 | 12/1955 | Briner | 324—54 |
| 2,752,590 | 6/1956 | Towle | 324—54 X |
| 2,976,484 | 3/1961 | McClain | 324—51 |
| 3,074,013 | 1/1963 | Bowden | 324—51 |

RUDOLPH V. ROLINEC, *Primary Examiner.*

WALTER L. CARLSON, *Examiner.*

G. R. STRECKER, *Assistant Examiner.*